(12) United States Patent
Sychra et al.

(10) Patent No.: US 7,460,941 B2
(45) Date of Patent: Dec. 2, 2008

(54) SLOPE-LIMITED RETARDING CONTROL FOR A PROPELLED MACHINE

(75) Inventors: Robert Roy Sychra, Washington, IL (US); Stephen Carl Garnett, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 11/067,623

(22) Filed: Feb. 28, 2005

(65) Prior Publication Data

US 2006/0069488 A1   Mar. 30, 2006

Related U.S. Application Data

(63) Continuation-in-part of application No. 10/952,173, filed on Sep. 29, 2004, now abandoned.

(51) Int. Cl.
*E02F 9/20* (2006.01)

(52) U.S. Cl. .............................. 701/50; 37/412; 37/348; 180/315

(58) Field of Classification Search ............. 701/50–99; 477/7; 37/414, 348, 412, 382; 172/2; *G06F 19/00; B60K 26/00*
See application file for complete search history.

(56) References Cited

U.S. PATENT DOCUMENTS

| | | | |
|---|---|---|---|
| 4,335,428 A | | 6/1982 | Miki et al. |
| 4,485,444 A | | 11/1984 | Maruyama et al. |
| 5,223,845 A | * | 6/1993 | Eguchi ....................... 342/359 |
| 5,462,125 A | * | 10/1995 | Stratton et al. .............. 172/826 |
| 5,467,829 A | * | 11/1995 | Barton et al. ................ 172/4.5 |
| 5,479,345 A | | 12/1995 | Amsallen |
| 5,555,170 A | | 9/1996 | Nakashima |
| 5,941,614 A | | 8/1999 | Gallery et al. |
| 5,997,108 A | | 12/1999 | Claussen et al. |

(Continued)

FOREIGN PATENT DOCUMENTS

EP        0754588        1/1997

(Continued)

OTHER PUBLICATIONS

Covino, M., Grassi, M.L., Pagano, E., "Analysis of braking operations in present-day electric drives with asynchronous motors", Electric Machines and Drives Conference Record, 1997, IEEE International, vol. 4, Issue 1, Mar. 1989 pp. 81-87 Digital Object Identifier 10.1109/60.23154.*

(Continued)

*Primary Examiner*—Tuan C To
(74) *Attorney, Agent, or Firm*—Finnegan, Henderson, Farabow, Garrett & Dunner (57) ABSTRACT

A method is provided for dissipating power in a propelled machine having an electric drive system and a mechanical brake system. An inclination of the machine is determined. A speed of the machine is determined. A retarding requirement is determined based on the determined inclination and speed. A first portion of the retarding requirement is allocated to be met by the electric drive system, the first portion being less than or equal to a retarding capacity of the electric drive system. A second portion of the retarding requirement is allocated to be met by the mechanical brake system if the retarding requirement is greater than the retarding capacity of the electric drive system.

16 Claims, 5 Drawing Sheets

U.S. PATENT DOCUMENTS

| | | | |
|---|---|---|---|
| 6,062,317 A * | 5/2000 | Gharsalli et al. ............... 172/2 |
| 6,164,117 A * | 12/2000 | Passwater et al. ............ 73/1.78 |
| 6,209,232 B1 * | 4/2001 | Ono et al. ..................... 37/348 |
| 6,240,356 B1 * | 5/2001 | Lapke .......................... 701/93 |
| 6,249,733 B1 | 6/2001 | Smith |
| 6,253,136 B1 * | 6/2001 | Stratton et al. ................ 701/50 |
| 6,263,595 B1 * | 7/2001 | Ake ............................. 37/348 |
| 6,299,263 B1 | 10/2001 | Uematsu et al. |
| 6,349,253 B1 | 2/2002 | Bellinger |
| 6,478,716 B2 | 11/2002 | Onimaru et al. |
| 6,625,535 B2 | 9/2003 | Han et al. |
| 6,688,403 B2 * | 2/2004 | Bernhardt et al. .............. 172/2 |
| 6,691,437 B1 * | 2/2004 | Yost et al. ..................... 37/348 |
| 2004/0133338 A1 | 7/2004 | Verhagen et al. |
| 2004/0238244 A1 | 12/2004 | Amanuma et al. |
| 2005/0131611 A1 * | 6/2005 | Anderson et al. ............. 701/50 |
| 2006/0041361 A1 * | 2/2006 | Matrosov ..................... 701/50 |
| 2006/0042804 A1 * | 3/2006 | Pecchio ....................... 172/4.5 |

FOREIGN PATENT DOCUMENTS

| | | |
|---|---|---|
| JP | 62110402 | 5/1987 |
| JP | 6-135260 | 5/1994 |
| WO | WO 2005/012049 | 2/2005 |

OTHER PUBLICATIONS

Patent Abstracts of Japan, vol. 011 No. 327-Oct. 24, 1987, JP 62110402 of May 21, 1987, Fuji Elec.

* cited by examiner

SLOPE-LIMITED RETARDING CONTROL FOR A PROPELLED MACHINE

RELATED APPLICATIONS

This application is a continuation-in-part of U.S. application Ser. No. 10/952,173, filed Sep. 29, 2004 now abandoned.

TECHNICAL FIELD

The present disclosure relates generally to retarding control for a propelled machine and, more specifically, to a retarding control for a propelled machine having an electric drive.

BACKGROUND

Propelled machines, such as trucks, wheeled tractors, track type tractors and other construction vehicles, frequently operate on steep slopes. When descending such slopes, these machines may use various retarding systems in order to dissipate kinetic energy so as to maintain a safe speed. For example, the machine may be slowed using engine retarding and/or mechanical braking.

Previously, when operating on such slopes, the machine operator had the responsibility of selecting an appropriate operating speed. For example, the operator was required to select the correct transmission gear and apply the correct amount of brake force to descend a slope at a speed the operator considered safe. However, if the operator was careless in his selection, the engine could be over-sped or the brakes over-heated, thus damaging the machine. If the operator was too cautious, the machine would take more time than was necessary to descend the slope safely and, thus, the machine would be less than optimally productive.

Prior art systems for automatically controlling the retarding systems of a vehicle when descending a slope have been developed. One such system is described in U.S. Pat. No. 6,299,263, entitled "Automatic Retarder Controller." In this system, the inclination of the vehicle's forward tilting angle is detected, and a controller selects a transmission gear and applies the brakes to slow the machine to predetermined descent speed based on the angle. The retarding technique of the '263 patent, however, is not applicable to machines having electric drive propulsion/retarding systems. Further, the system disclosed by the '263 patent does not consider the inclination of the vehicle around a roll axis when selecting the descent speed.

The presently disclosed slope-limited retarding control system is directed toward solving one or more of these shortcomings of the prior art retarding control systems.

SUMMARY OF THE INVENTION

A method is provided for dissipating power in a propelled machine having an electric drive system and a mechanical brake system. An inclination of the machine is determined. A speed of the machine is determined. A retarding requirement is determined based on the determined inclination and speed. A first portion of the retarding requirement is allocated to be met by the electric drive system, the first portion being less than or equal to a retarding capacity of the electric drive system. A second portion of the retarding requirement is allocated to be met by the mechanical brake system if the retarding requirement is greater than the retarding capacity of the electric drive system.

In another aspect, a system is provided for dissipating power in a propelled machine having an electric drive system and a mechanical brake system. An inclination indicator is operable to output a signal corresponding to an inclination of the machine. A speed indicator is operable to output a signal corresponding to a speed of the machine. A retarding requirement calculator is operable to determine a retarding requirement based on the indicated inclination and speed. A controller is operable to allocate a first portion of the retarding requirement to be met by the electric drive system, the first portion being less than or equal to a retarding capacity of the electric drive system, and to allocate a second portion of the retarding requirement to be met by the mechanical brake system if the retarding requirement is greater than the retarding capacity of the electric drive system.

In another aspect, a method is provided for dissipating power in a propelled machine. An inclination of the machine around a roll axis of the machine is determined. A slope-limited speed of the machine is determined based on the inclination. An amount of retarding required to slow the machine to the slope-limited speed is determined.

In another aspect, a system is provided for dissipating power in a propelled machine. An inclination indicator is operable to output a signal corresponding to an inclination of the machine around a roll axis of the machine. A slope-limited speed calculator is operable to calculate a slope-limited speed of the machine based on the inclination. A retarding requirement calculator is operable to calculate an amount of retarding required to slow the machine to the slope-limited speed.

It is to be understood that both the foregoing general description and the following detailed description are exemplary and explanatory only and are not restrictive of the invention, as claimed.

DETAILED DESCRIPTION

Figure 1:
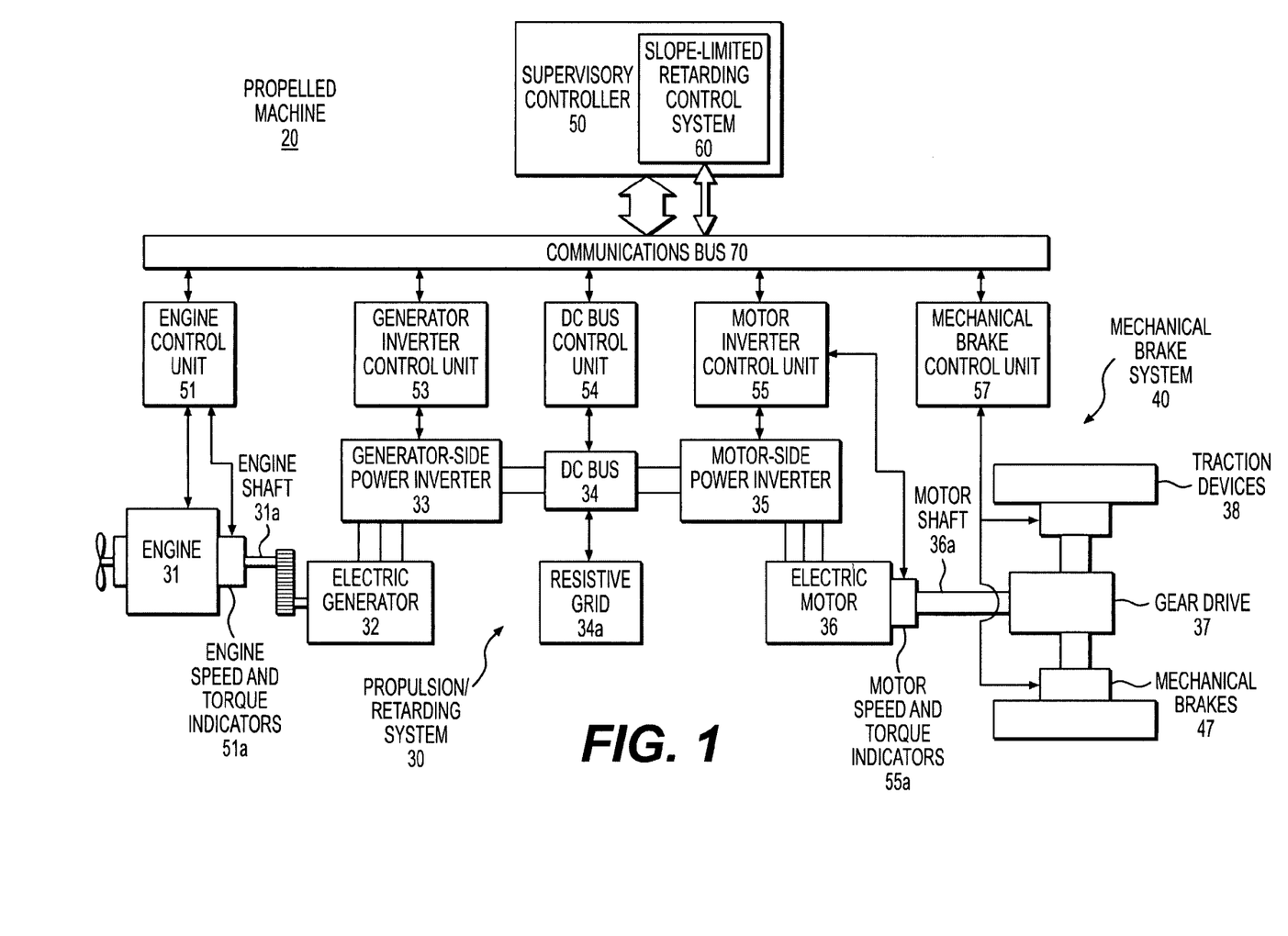
FIG. 1 schematically illustrates a propelled machine having a slope-limited retarding control system in accordance with an exemplary embodiment of the present disclosure.

FIG. 1 schematically illustrates a propelled machine 20 having a slope-limited retarding control system 60 in accordance with an exemplary embodiment of the present disclosure. Propelled machine 20 may include a propulsion/retarding system 30 and a mechanical brake system 40. In the illustrated embodiment, propulsion/retarding system 30 is an electric drive system. However, the present disclosure is equally applicable to propelled machines having conventional propulsion/retarding systems, such as mechanical propulsion/retarding systems.

As illustrated in FIG. 1, electric drive propulsion/retarding system 30 may include: an engine 31 controlled by an engine control unit 51 and having an engine shaft 3 1a; an electric generator 32; a generator-side power inverter 33 controlled by a generator inverter control unit 53; a DC bus 34 controlled by a DC bus control unit 54 and linked to a resistive grid 34a; a motor-side power inverter 35 controlled by a motor inverter control unit 55; an electric motor 36 having a motor shaft 36a; a gear drive 37; and traction devices 38. These components 31-38 of electric drive propulsion/retarding system 30 are operatively coupled to provide power so as to propel machine 20 during a propulsion phase of operation and to dissipate power so as to retard machine 20 during a retarding phase of operation.

Engine 31 may be of any conventional type. For example, engine 31 may be a diesel, gasoline, or natural gas driven internal combustion engine.

Engine 31 may be configured to drive various mechanically powered accessories (not shown) of propelled machine 20. For example, engine 31 may be coupled to drive one or more hydraulic pumps, water pumps, a fan, an alternator, etc., of propelled machine 20. During a propulsion phase, engine 31 may combust fuel to rotate engine shaft 31a. During a retarding phase, engine shaft 31a may be driven by generator 32 (then acting as a motor). When driven in this manner, engine 31 may dissipate undesired power through engine friction, exhaust restrictors, compression release devices, and driven accessories (e.g., pumps, etc.) of the engine. Engine 31 may also be equipped to act as an air compressor so as to dissipate additional energy during a retarding phase. For example, engine 31 may be equipped with a conventional "Jake brake" attachment.

Engine control unit 51 controls the rotational speed or torque of engine shaft 31a. For example, engine control unit 51 may sense the rotational speed and torque of engine shaft 31a via engine speed and torque indicators 51a and control the amount of fuel that is delivered to engine 31, e.g., by fuel injectors (not shown), to produce a desired rotational speed and torque of the engine. When engine 31 is driven by generator 32 (then acting as a motor) during a retarding phase, engine control unit 51 may reduce or cut off the flow of fuel to engine 31, thus saving fuel and lowering the operating costs for machine 20.

In addition, engine control unit 51 may communicate data from engine sensors, such as engine speed and torque indicators 51a and/or other sensors (not shown), to a supervisory controller 50 over a communications bus 70. These data may provide an indication of the present dissipating potential of engine 31. For example, the dissipating potential of engine 31 may be associated with a non-damaging rotational speed limit of engine shaft 31a, i.e., a rotational speed that will not cause unacceptable wear on engine 31 or its driven accessories.

Electric generator 32 may be of any appropriate type. For example, generator 32 may be an AC induction, permanent magnet, AC synchronous or switched reluctance generator. During a propulsion phase, generator 32 may be driven by engine 31 to produce an alternating current. During a retarding phase, generator 32 may act as a motor so as to drive engine 31, thus dissipating undesired power in the manner discussed above.

Generator inverter control unit 53 controls the orientation of generator-side power inverter 33 so as to control the flow of power between generator 32 and DC bus 34. During a propulsion phase, generator inverter control unit 53 may control the vector orientation of generator-side power inverter 33 so as to convert an AC output of generator 32 to a direct current appropriate for DC bus 34. During a retarding phase, generator inverter control unit 53 may control the orientation of generator-side power inverter 33 so as to convert a DC output of DC bus 34 to an alternating current appropriate to drive generator 32 (then acting as a motor) to produce a desired rotational speed of engine shaft 31a, up to a rotational speed limit of engine 31.

In addition, generator inverter control unit 53 may communicate data from sensors, such as temperature, voltage or current sensors (not shown), to supervisory controller 50 over communications bus 70. These data may provide an indication of the power dissipating potential of the electric generator 32. For example, the dissipating potential of generator 32 may be associated with non-damaging temperature, voltage or current limits of generator 32 and/or generator-side power inverter 33.

DC bus 34 conducts current between generator-side power inverter 33, motor-side power inverter 35 and resistive grid 34a. DC bus control unit 54 controls the distribution of DC power between generator-side power inverter 33, motor-side power inverter 35 and resistive grid 34a. During a propulsion phase, DC bus control unit 54 may distribute DC power to motor-side power inverter 35. During a retarding phase, DC bus control unit may distribute DC power to generator-side power inverter 33 and/or resistive grid 34a.

Resistive grid 34a may be any conventional device that may dissipate undesired power by converting it to heat. For example, resistive grid 34a may include one or more electrical resistors. Resistive grid 34a may also include an appropriate cooling system (not shown) to aid in dissipating excess heat.

In addition, DC bus control unit 54 may communicate data from DC bus sensors (not shown) to supervisory controller 50 over communications bus 70. These data may provide an indication of a power dissipating potential of resistive grid 34a. For example, the dissipating potential of resistive grid 34a may be associated with non-damaging temperature, voltage or current limits of DC bus 34 and/or resistive grid 34a.

Motor inverter control unit 55 may control the orientation of motor-side power inverter 35 so as to control the flow of power between DC bus 34 and motor 36. During a propulsion phase, motor inverter control unit 55 may control the vector orientation of motor-side power inverter 35 so as to convert the DC output of DC bus 34 to an alternating current appropriate to drive electric motor 36 to produce a desired motor shaft speed and torque. During a retarding phase, motor inverter control unit 55 may control the orientation of motor-side power inverter 35 so as to convert the AC output of motor 36 (acting as a generator) to a direct current appropriate for DC bus 34.

Electric motor 36 may be of any appropriate type. For example, motor 36 may be an AC induction, permanent magnet, AC synchronous or switched reluctance motor. During a propulsion phase, electric motor 36 may convert AC power received from motor-side power inverter 35 to produce a desired rotational speed and torque of motor shaft 36a. During a retarding phase, motor 36 may be reversible to act as a generator that may convert the non-driven rotation of traction devices 38 into a current.

In addition, motor inverter control unit 55 may communicate data from sensors, such as motor speed and torque indicators 55a, and/or temperature, voltage or current sensors (not shown), to supervisory controller 50 over communications bus 70. These data may provide an indication of the power dissipating potential of motor 36. For example, the dissipating potential of motor 36 may be associated with non-damaging temperature, voltage or current limits of motor 36 and/or motor-side power inverter 35. The dissipating potential of motor 36 may also be associated with a non-damaging rotational speed limit of motor shaft 36a.

Gear drive 37 operatively couples motor shaft 36a to traction devices 38, such as, for example, conventional wheels or sprockets. Gear drive 37 may include, for example, a conventional gear reduction and/or differential. During a propulsion phase, motor 36 may turn motor shaft 36a, and thus turn gear drive 37 and traction devices 38 so as to propel machine 20 over the ground. During a retarding phase, the non-driven rotation of traction devices 38 may turn gear drive 37, and thus turn motor shaft 36a to drive motor 36 (then acting as a generator).

Mechanical brake system 40 may include one or more mechanical brakes 47 controlled by a mechanical brake control unit 57. Brakes 47 may be of any conventional type having variable control. For example, brakes 47 may be mechanically or hydraulically actuated by an appropriate mechanical or fluid control system, or may be in the form of a hydraulic retarder. During application of the brakes 47, undesired power may be dissipated in the form of heat. Accordingly, brakes 47 may be equipped with a conventional cooling system. Although brakes 47 are illustrated as being coupled to traction devices 38, it will be understood that the number and location of brakes 47 may be varied as known in the art.

Mechanical brake control unit 57 may control the application of brakes 47. In addition, mechanical brake control unit 57 may communicate data from conventional sensors, such as a temperature sensor (not shown), to supervisory controller 50 over communications bus 70. These data may provide an indication of the present dissipating potential of brakes 47. For example, the dissipating potential of brakes 47 may be associated with a present temperature of the brakes compared to a maximum non-damaging temperature limit of brakes 47.

Supervisory controller 50 may control electric drive propulsion/retarding system 30 and/or mechanical brake system 40 to produce a desired propulsion or retarding of machine 20. Controller 50 may control electric drive propulsion/retarding system 30 and/or mechanical brake system 40 by sending appropriate commands to control units 51, 53, 54, 55 and/or 57.

Controller 50 may also receive data from control units 51, 53, 54, 55 and/or 57. These data may provide an indication of the amount of power that electric drive propulsion/retarding system 30 and/or mechanical brake system 40 are presently capable of producing or dissipating. Controller 50 may communicate with control units 51, 53, 54, 55 and/or 57 over communications bus 70.

Controller 50 and control units 51, 53, 54, 55 and 57 may be implemented in any appropriate manner. For example, controller 50 and control units 51, 53, 54, 55 and 57 may be implemented using appropriately configured computer software. Although controller 50 and control units 51, 53, 54, 55 and 57 are illustrated separately, it will be understood that one or more of control units 51, 53, 54, 55 and 57 may be integrated with controller 50, e.g., as modules within a supervisory control program.

Figure 2:
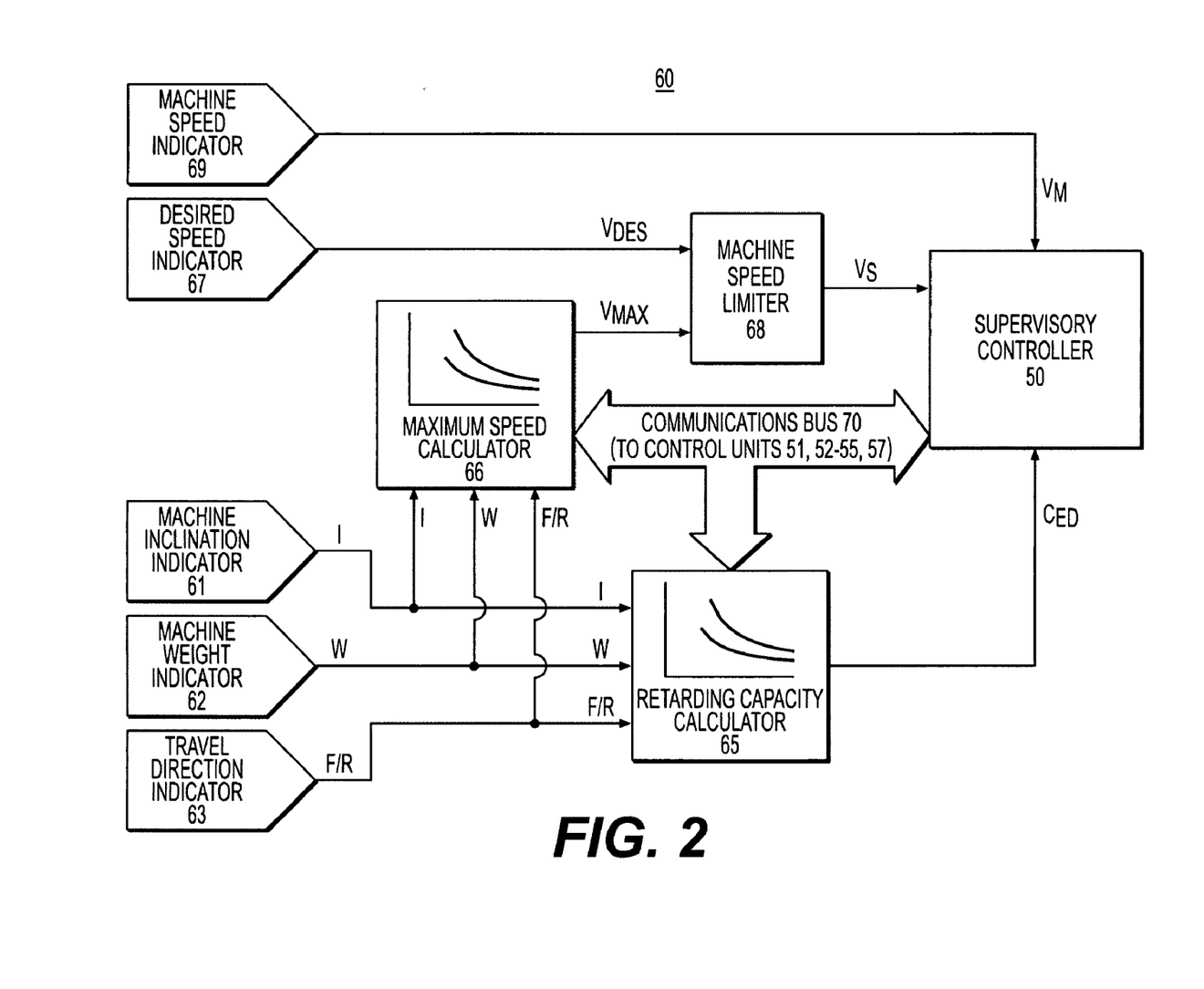
FIG. 2 schematically illustrates a slope-limited retarding control system in accordance with an exemplary embodiment of the present disclosure.

FIG. 2 schematically illustrates a slope-limited retarding control system 60 in accordance with an exemplary embodiment of the present disclosure. As illustrated in FIG. 2, slope-limited retarding control system 60 may include: an inclination indicator 61; a machine weight indicator 62; a travel direction indicator 63; a retarding capacity calculator 65; a maximum speed calculator 66; a desired speed indicator 67; a machine speed limiter 68; and a machine speed indicator 69. As illustrated in FIG. 1, control system 60 may be integrated within supervisory controller 50. Alternatively, control system 60 may be implemented separately from controller 50.

Figure 3:
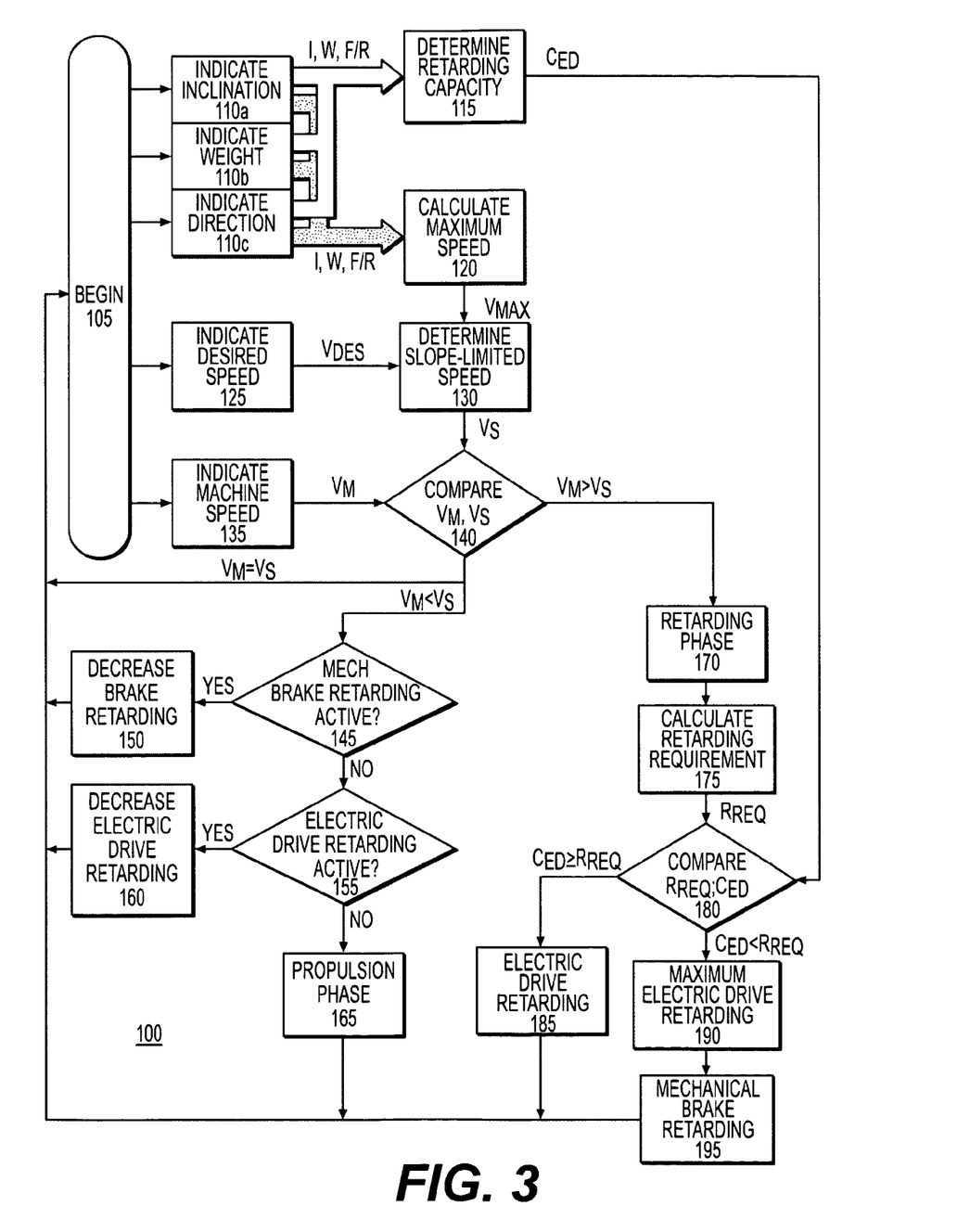
FIG. 3 is a flow diagram that illustrates a retarding strategy in accordance with exemplary embodiment of the present disclosure.

Slope-limited retarding control system 60 may implement a retarding strategy that controls the operation of electric drive propulsion/retarding system 30 and/or mechanical brake system 40 so as to limit the speed of machine 20 down an incline. FIG. 3 is a flow diagram that illustrates a retarding strategy 100 in accordance with an exemplary embodiment of the present disclosure. While exemplary retarding strategy 100 may be described as a series of acts, the order of the acts may vary in other implementations consistent with the present disclosure. In particular, non-dependent acts may be performed in any order, or in parallel.

Retarding strategy 100 may begin at 105. The beginning (105) of strategy 100 may be under the control of a system clock (not shown) such that strategy 100 is periodically iterated, e.g., multiple times per second or at any other desired time interval, during operation of machine 20. Thus, retarding strategy 100 may respond to changes in the operating conditions of machine 20.

Figure 4:
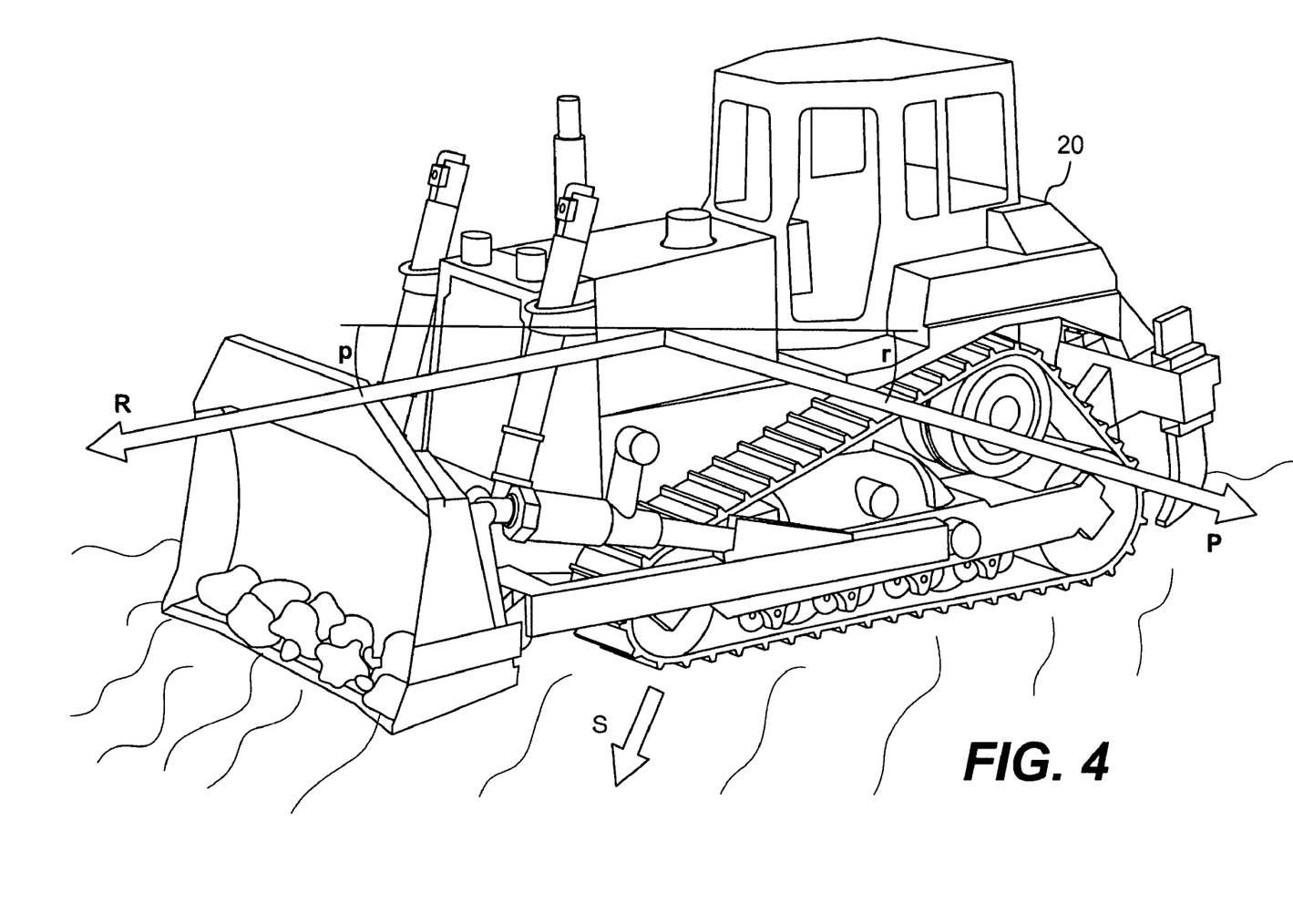
FIG. 4 illustrates a propelled machine moving across a slope.

At 110a, inclination indicator 61 outputs a signal indicative of a present inclination I of machine 20. FIG. 4 illustrates a machine 20 (in this case, a bulldozer), moving across a slope S. In one embodiment, indicator 61 may indicate the inclination p of machine 20 around a pitch axis P of machine 20. Indicator 61 may indicate both positive and negative pitch such that the downhill grade may be determined for travel in both the forward and reverse directions. For example, indicator 61 may indicate pitch in a range of ±45° (±100% grade). Alternatively, indicator 61 may indicate the inclination r of machine 20 around a roll axis R of machine 20. As a further alternative, indicator 61 may indicate the inclination I of machine 20 around both the pitch and roll axes. For example, indicator 61 may output one signal indicative of the inclination of machine 20 around pitch axis P and another signal indicative of the inclination of machine 20 around roll axis R. Alternately, indicator 61 may output a single signal indicative of the inclination of the machine around both the pitch and roll axes, e.g., a signal indicative of a weighted sum of the inclination of machine 20 around pitch axis P and roll axis R. Indicator 61 may be implemented using any appropriate inclination sensor or sensors known to those skilled in the art. For example, indicator 61 may be implemented using one or more inclinometers or accelerometers affixed to a frame (not shown) of machine 20.

At 110b, machine weight indicator 62 may output a signal indicative of the weight W of machine 20. Indicator 62 may be a sensor that senses the weight W of machine 20, e.g., by sensing a stress on a suspension component (not shown) of machine 20. Alternatively, indicator 62 may be an input controlled by an operator of machine 20. For instance, an operator may enter an indication of the weight W, e.g., using a keypad, prior to operating machine 20. As a further alternative, indicator 62 may indicate a predetermined value, such as a maximum weight W expected during normal operation of machine 20.

At 110c, travel direction indicator 63 may output a signal indicative of the present travel direction F/R of machine 20, i.e., whether machine 20 is traveling in the forward or the reverse direction. Indicator 63 may be implemented using any sensor considered appropriate by those skilled in the art. For example, indicator 63 may sense whether a forward or reverse selection lever (not shown) of machine 20 has been placed in a forward or a reverse position. Alternatively, indicator 63 may sense whether the orientation of generator-side power inverter 33 and/or motor-side power inverter 35 corresponds to a forward or a reverse direction of travel. However, in one embodiment, direction indicator 63 may be omitted and slope-limited retarding control system 60 may function equivalently during travel in both the forward and reverse directions. Alternatively, control system may operate only during travel in one direction, e.g., the forward direction.

At 115, retarding capacity calculator 65 receives the inclination I from inclination indicator 61 and outputs a signal indicative of a maximum non-damaging retarding capacity of the electric drive propulsion/retarding system 20, i.e., a slope-limited retarding capacity $C_{ED}$, based upon the inclination I. Calculator 65 may include data, e.g., a map, or formulae that define a relationship between inclination, e.g., pitch and/or roll, and retarding capacity for electric drive propulsion/retarding system 30.

Figure 5:
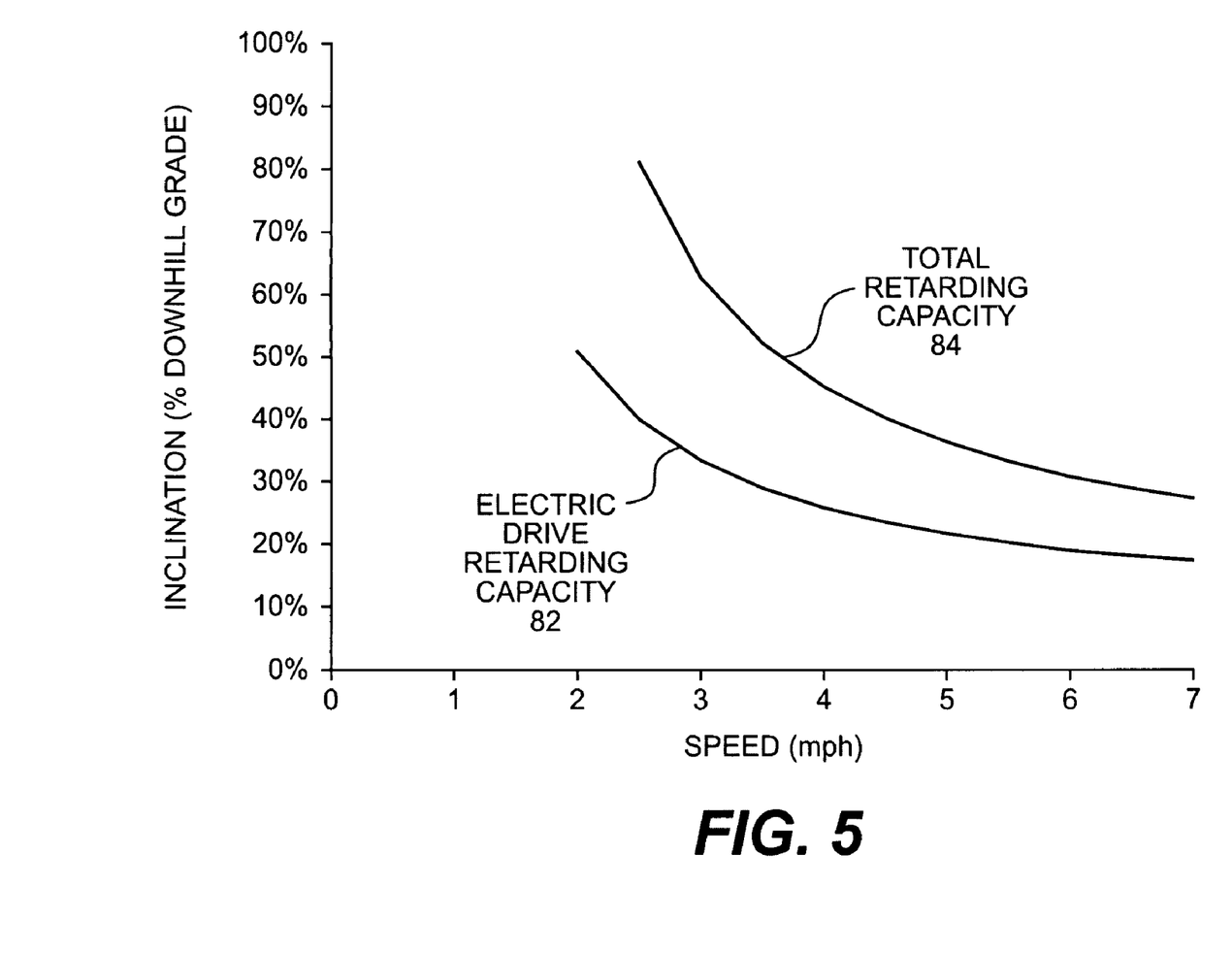
FIG. 5 is a graph that illustrates the relationship between retarding capacity and inclination for an exemplary propelled machine.

For example, calculator 65 may contain data or formulae corresponding to an electric drive retarding capacity curve 82 (see FIG. 5) developed for the particular machine configuration. As shown in FIG. 5, electric drive retarding capacity curve 82 indicates the maximum non-damaging forward speed (x-axis) at which a slope of a given inclination (y-axis) may be descended using the retarding capacity of the electric drive propulsion/retarding system 30 alone, i.e., without damage to the electric drive propulsion/retarding system. For example, as shown FIG. 5, a machine 20 of the particular configuration for which curve 82 was developed may descend a 40% grade at 2.5 mph, relying solely on its electric drive propulsion/retarding system 30, without damage.

The calculation of the slope-limited retarding capacity $C_{ED}$ by retarding capacity calculator 65 may also be based on other data in addition to inclination I. For example, the calculation of the slope-limited retarding capacity $C_{ED}$ may additionally be based upon the weight W of machine 20 (which may be received from machine weight indicator 62) and/or the direction of travel F/R of machine 20 (which may be received from travel direction indicator 63). Further, the calculation of the slope-limited retarding capacity $C_{ED}$ may additionally be based upon data communicated by electric drive control units 51, 53, 54 and/or 55 that may be indicative of one or more conditions that may affect the retarding capacity of electric drive propulsion/retarding system 30. For example, one or more of electric drive control units 51, 53, 54 and/or 55 may communicate a fault condition indicative of a reduced retarding capacity. Retarding capacity calculator 65 may include additional data or formulae that define a relationship between retarding capacity and these conditions.

At 120, maximum speed calculator 66 outputs a signal indicative of a maximum non-damaging machine speed $V_{MAX}$ based upon inclination I. Calculator 66 may include data, e.g., a map, or formulae that define a relationship between inclination, e.g., pitch and/or roll, and maximum speed for electric drive 20.

For example, calculator 66 may contain data or formulae corresponding to total retarding capacity curve 84 (see FIG. 5) developed for the particular machine configuration. As shown in FIG. 5, total retarding capacity curve 84 indicates the maximum non-damaging speed (x-axis) at which a slope of a given inclination (y-axis) may be descended using the retarding capacity of the electric drive propulsion/retarding system 30 as well as the mechanical brake system 40, i.e., without damage to these systems. For example, as shown FIG. 5, a machine 20 of the particular configuration for which curve 82 was developed may descend a 40% grade at 4.5 mph without damage when both the mechanical brake system 40 and the electric drive propulsion/retarding system 30 are available for retarding.

The calculation of maximum speed $V_{MAX}$ by maximum speed calculator 66 may also be based on other data in addition to inclination I. For example, the determination of the maximum speed $V_{MAX}$ may additionally be based upon the weight W of machine 20 (which may be received from machine weight indicator 62) and/or the direction of travel F/R of machine 20 (which may be received from travel direction indicator 63). Further, the calculation of maximum speed $V_{MAX}$ may additionally be based upon data communicated by electric drive control units 51, 53, 54, 55 and/or 57 that may be indicative of one or more conditions that may affect the retarding capacity of electric drive propulsion/retarding system 30 and/or mechanical brake system 40. For example, maximum speed $V_{MAX}$ may be lowered where mechanical brake control unit 57 reports an over-temperature condition of mechanical brakes 47.

Maximum speed calculator 66 may include additional data or formulae that define a relationship between maximum speed $V_{MAX}$ and these conditions.

The retarding capacity calculator 65 and maximum speed calculator 66 for a particular machine configuration may be developed empirically by operational testing of a particular machine configuration over different ground inclinations. Alternatively, calculators 65 and 66 may be developed by modeling the performance of the particular machine configuration, e.g., using computer simulation techniques, or by a combination of empirical testing and simulation.

At 125, desired speed indicator 67 outputs a signal indicative of a desired speed $V_{DES}$ of machine 20. Indicator 67 may be an input, such as a throttle or speed selector, controlled by an operator of machine 20. In one embodiment, indicator 67 may be a speed selector that includes a setting that allows the operator to select the maximum non-damaging machine speed $V_{MAX}$ as the desired speed. Alternatively, indicator 67 may be an output of a machine controller, such as supervisory controller 50, that may calculate a desired speed for machine 20. For example, controller 50 may output a desired speed and torque necessary to produce a desired amount power at a drawbar (not shown) of machine 20.

At 130, machine speed limiter 68 may receive the desired speed $V_{DES}$ from desired speed indicator 67 and maximum speed $V_{MAX}$ from maximum speed calculator 66, and may output a signal indicative of a slope-limited speed $V_S$ based on the desired speed $V_{DES}$ and the maximum speed $V_{MAX}$. The slope limited speed $V_S$ may correspond to the lower of the desired speed $V_{DES}$ and the maximum speed $V_{MAX}$. For example, where the desired speed $V_{DES}$ is lower than the maximum speed $V_{MAX}$, the slope-limited speed signal $V_S$ may correspond to the desired speed $V_{DES}$, so as to produce the desired speed selected by an operator or other controller. However, where the desired speed $V_{DES}$ is higher than the maximum speed $V_{MAX}$, the slope-limited speed signal $V_S$ may correspond to the maximum speed $V_{MAX}$ so as to prevent an operator or other controller from requesting a speed that may damage components of machine 20.

At 135, machine speed indicator 69 may output a signal related to a speed $V_M$ of machine 20 over the ground. Indicator 69 may determine the machine speed $V_M$ in any conventional manner. Machine speed $V_M$ may be related to the actual speed of machine 20 over the ground. For example, the ground speed may be determined using a Doppler radar directed at the ground. A Doppler laser may be used in a similar manner. Alternatively, a non-driven ground-engaging wheel could also be used to sense ground speed. Ground speed could also be determined by measuring the change in position of the tractor over time, e.g., using a Global Positioning System (GPS) receiver. Alternatively, machine speed $V_M$ may be related to the theoretical speed of machine 20 over the ground. For example, the theoretical speed may be calculated as a function of the circumference of the traction devices 38, the reduction ratio of gear drive 37, and the rotational speed of motor shaft 36a, e.g., as communicated by motor speed and torque indicators 55a. However, the theoretical speed may be determined in any other appropriate manner known to those skilled in the art.

At 140, supervisory controller 50 may compare the machine speed $V_M$ received from machine speed indicator 69 to the slope-limited speed $V_S$ received from machine speed limiter 68. Supervisory controller 50 may then control electric drive propulsion/retarding system 30 to propel machine 20 at the slope-limited speed $V_S$.

If the machine speed $V_M$ is equal to the slope-limited speed $V_S$ ($V_M$=$V_S$), to within an acceptable margin of error, then supervisory controller 50 may take no further action, and retarding strategy 100 may return to begin another periodic iteration (105).

If the machine speed $V_M$ is less than the slope-limited speed $V_S$ ($V_M$<$V_S$) by more than the acceptable margin of error, then supervisory controller 50 may control electric drive propulsion/retarding system 30 to increase machine speed to achieve the slope limited speed. Using the exemplary total retarding capacity curve 84 (FIG. 5) as an example, if machine 20 travels at 4.0 mph down a 40% grade, controller 50 may control propulsion/retarding system 30 in order to increase machine speed to achieve a slope-limited speed of 4.5 mph.

In order to increase the machine speed, supervisory controller 50 may first determine whether mechanical brake system 40 is actively retarding propelled machine 20 (145). For example, controller 50 may determine if mechanical brake control unit 57 is currently controlling mechanical brakes 47 to slow machine 20, e.g., in response to a retarding command from controller 50 during a previous iteration of retarding strategy 100. If so (145: Yes), then controller 50 may command mechanical brake control unit to decrease the amount of power dissipated by mechanical brakes 47 (at 150) until the slope-limited speed is achieved or mechanical brake system 40 is no longer actively retarding machine 20 (i.e., mechanical brakes 47 are no longer applied).

If mechanical brake system 40 is not actively retarding propelled machine 20 (145: No) and the machine speed remains less than the slope-limited speed, then supervisory controller 50 may determine whether electric drive propulsion/retarding system 30 is actively retarding propelled machine 20 (155). For example, controller 50 may determine if propulsion/retarding system 30 is currently dissipating power to slow machine 20, e.g., in response to a retarding command from controller 50 during a previous iteration of retarding strategy 100. If so (155: Yes), then controller 50 may command electric drive control units 51, 53, 54 and/or 55 to decrease the amount of power dissipated by propulsion retarding system 30 (at 160) until the slope-limited speed is achieved or propulsion/retarding system 30 is no longer actively retarding machine 20.

If electric drive propulsion/retarding system 30 is not actively retarding propelled machine 20 (155: No) and the machine speed remains less than the slope-limited speed, then supervisory controller 50 may control electric drive propulsion/retarding system 30 to enter a propulsion phase (165). During the propulsion phase, engine control unit 51 may control engine 31 to combust an amount of fuel needed to produce a desired rotational speed and torque output of engine shaft 31a. Generator 32 may convert the mechanical power produced by engine 31 into AC power. Generator inverter control unit 53 may control the orientation of generator-side power inverter 33 to convert the AC output of generator 32 to DC. DC bus control unit 54 may distribute the portion of the DC power needed to propel machine 20 at the slope-limited speed $V_S$ to motor-side power inverter 35. Motor inverter control unit 55 may control the orientation of motor-side power inverter 35 to direct current from DC bus 34 to motor 36. Motor 36 may convert the AC output of motor-side power inverter 35 to produce a desired rotational speed and torque of motor shaft 36a. The rotation of motor shaft 36a may be coupled to traction devices 38 through gear drive 37 so as to propel machine 20 at the slope-limited speed $V_S$.

If the machine speed $V_M$ is greater than the slope-limited speed $V_S$ ($V_M$>$V_S$) by more than the acceptable margin of error, then supervisory controller 50 may enter a retarding phase (170). Again using exemplary total retarding capacity curve 84 (FIG. 5) as an example, if machine 20 travels at 6.0 mph down a 40% grade, controller 50 may enter a retarding phase in order to reduce machine speed to a slope limited speed of 4.5 mph. Supervisory controller may also enter a retarding phase at any time an operator of machine 20 requests retarding. In a retarding phase, supervisory controller 50 controls electric drive retarding system 30 and/or mechanical brake system 40 to slow machine 20 to the slope-limited speed $V_S$.

At 175, supervisory controller 50 may calculate a retarding requirement $R_{REQ}$ indicative of the amount of power that must be dissipated in order to slow machine 20 from the present machine speed $V_M$ to the slope limited speed $V_S$. For example, supervisory controller 50 may include data, e.g., a map, or formulae that determine an amount of power that must be dissipated in order to achieve a given reduction in machine speed. The calculation of the retarding requirement $R_{REQ}$ by supervisory controller may based on the inclination I of machine 20 (which may be retrieved from machine inclination indicator 61), the weight W of machine 20 (which may be received from machine weight indicator 62) and/or the direction of travel F/R of machine 20 (which may be received from travel direction indicator 63).

At 180, supervisory controller 50 may compare the retarding requirement $R_{REQ}$ to the slope-limited retarding capacity of the electric drive $C_{ED}$ received from retarding capacity calculator 65 and allocate portions of the retarding requirement to be met by the various retarding components of machine 20. If the slope-limited retarding capacity of the electric drive $C_{ED}$ is greater than or equal to the retarding requirement $R_{REQ}$ ($C_{ED} \geqq R_{REQ}$), then supervisory controller 50 may allocate the entire retarding requirement to electric drive propulsion/retarding system 30. For example, supervisory controller 50 may control electric drive propulsion/retarding system 30 to dissipate an amount of undesired power equal to the retarding requirement $R_{REQ}$ so as to slow machine 20 to the slope limited speed $V_S$ (185). The process may then return to begin another periodic iteration (at 105).

Controller 50 may control electric drive propulsion/retarding system 30 by issuing appropriate commands to electric drive control units 51, 53, 54 and/or 55 so that undesired power may be dissipated by the engine 31 and/or resistive grid 34a. In one embodiment, undesired power is dissipated first using engine 31 up to its maximum dissipating potential and then using resistive grid 34a.

During retarding of machine 20 by the electric drive propulsion/retarding system 30, non-driven rotation of traction devices 38 may be coupled to electric motor 36 through gear drive 37. Electric motor 36 may then operate as a generator to convert the rotation of motor shaft 36a into AC power. Motor inverter control unit 55 may control the orientation of motor-side power inverter 35 to convert the AC output of motor 36 to DC. DC bus control unit 54 may distribute the DC power between generator-side power inverter 33 and/or resistive grid 34a. Generator inverter control unit 53 may control the orientation of generator-side power inverter 33 to direct current from DC bus 34 to generator 32. Generator 32 may convert the AC output of generator-side power inverter 33 to produce a desired rotational speed and torque of engine shaft 31a up to a non-damaging rotational speed limit of engine 31, thus dissipating undesired power through engine retarding. Resistive grid 34a may convert any remaining DC power from DC bus 34 into heat, thus dissipating the remaining undesired power. The dissipation of undesired power may slow machine 20 to the slope limited speed $V_S$.

If the slope-limited retarding capacity of the electric drive $C_{ED}$ is lower than the retarding requirement $R_{REQ}$ ($C_{ED}<R_{REQ}$), then supervisory controller 50 may allocate the retarding requirement between the electric drive propulsion/retarding system 30 and the mechanical brake system 40. For example, controller 50 may control electric drive propulsion/retarding system 30 to dissipate an amount of power equal to its slope-limited retarding capacity $C_{ED}$ (at 190) and also control the mechanical brake system 40 to dissipate a remainder (e.g., the entire remainder $R_{REQ}-C_{ED}$) of the undesired power (at 195) so as to slow machine 20 to the slope limited speed $V_S$.

Again using exemplary total retarding capacity curve 84 (FIG. 5) as an example, if machine 20 travels down a 40% grade, the slope-limited retarding capacity of the electric drive $C_{ED}$ would allow machine 20 to travel at only 2.5 mph. However, controller 50 may allow machine 20 to travel down a 40% grade at up to 4.5 mph by supplementing the retarding capacity of electric drive propulsion/retarding system 30 with retarding by mechanical brake control system 40. The process may then return to begin another periodic iteration (105).

Controller 50 may control mechanical brake system 40 by issuing appropriate commands to mechanical brake control unit 57 so that undesired power may be dissipated by mechanical brakes 47. During retarding of machine 20 by the mechanical brake system 40, activation of brakes 47 by control unit 57 may dissipate undesired power in the form of heat. Brakes 47 may be applied briefly above their sustained retarding capacity to slow machine 20 to the non-damaging slope-limited speed $V_S$.

INDUSTRIAL APPLICABILITY

The slope-limited retarding control system of the present disclosure may be applied to any type of propelled machine, including those with electric drive systems or other types of drive systems. In operation, the retarding control system of the present disclosure provides for the selection of a safe and non-damaging operating speed based upon the inclination of the machine around a pitch axis and/or a roll axis of the machine. By providing for the control of the electric drive propulsion/retarding system based upon the inclination of the machine, the retarding control system of the present disclosure allows machines employing such systems to be safely and efficiently operated on slopes.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A system for dissipating power in a propelled machine having an electric drive system and a mechanical brake system, comprising:
an inclination indicator configured to output a signal corresponding to an inclination of the machine;
a speed indicator configured to output a signal corresponding to a speed of the machine;
a retarding requirement calculator configured to determine a retarding requirement based on the indicated inclination and speed; and
a controller configured to:
allocate the retarding requirement to be met by the electric drive system, if the retarding requirement is less than or equal to a retarding capacity of the electric drive system; and
allocate the retarding requirement between the electric drive system and the mechanical brake system if the retarding requirement is greater than the retarding capacity of the electric drive system.

2. The system of claim 1, wherein the inclination indicator is configured to indicate inclination around a pitch axis of the machine.

3. The system of claim 2, wherein the inclination indicator is further configured to indicate inclination around a roll axis of the machine.

4. The system of claim 1, wherein the inclination indicator is configured to indicate inclination around a roll axis of the machine.

5. The system of claim 1, further including a travel direction indicator configured to indicate a travel direction of the machine; and
wherein the retarding requirement calculator is further configured to determine a retarding requirement of the electric drive system based on the travel direction.

6. The system of claim 1, wherein the controller is further configured to control the electric drive system to dissipate the retarding requirement allocated to the electric drive system and to control the mechanical brake system to dissipate the retarding requirement allocated to the mechanical brake system.

7. The system of claim 1, wherein the controller is further configured to control at least one of an engine of the electric drive system and a resistive grid of the electric drive system to dissipate the retarding requirement allocated to the electric drive system.

8. The system of claim 1, wherein the controller is further configured to control at least one brake of the mechanical brake system to dissipate the retarding requirement allocated to the mechanical brake system.

9. A propelled machine, comprising:
an electric drive system;
a mechanical brake system;
an inclination indicator configured to output a signal corresponding to an inclination of the machine;
a speed indicator configured to output a signal corresponding to a speed of the machine;
a retarding requirement calculator configured to determine a retarding requirement based on the indicated inclination and speed; and
a controller configured to:
allocate the retarding requirement to be met by the electric drive system, if the retarding requirement is less than or equal to a retarding capacity of the electric drive system; and
allocate the retarding requirement between the electric drive system and the mechanical brake system if the retarding requirement is greater than the retarding capacity of the electric drive system.

10. The machine of claim 9, wherein the inclination indicator is configured to indicate inclination around a pitch axis of the machine.

11. The machine of claim 10, wherein the inclination indicator is further configured to indicate inclination around a roll axis of the machine.

12. The machine of claim 9, wherein the inclination indicator is configured to indicate inclination around a roll axis of the machine.

13. The machine of claim 9, further including a travel direction indicator configured to indicate a travel direction of the machine; and wherein the retarding requirement calculator is further configured to determine a retarding requirement of the electric drive system based on the travel direction.

14. The machine of claim 9, wherein the controller is further configured to control the electric drive system to dissipate the retarding requirement allocated to the electric drive system and to control the mechanical brake system to dissipate the retarding requirement allocated to the mechanical brake system.

15. The machine of claim 9, wherein the controller is further configured to control at least one of an engine of the electric drive system and a resistive grid of the electric drive system to dissipate the retarding requirement allocated to the electric drive system.

16. The machine of claim 9, wherein the controller is further configured to control at least one brake of the mechanical brake system to dissipate the retarding requirement allocated to the mechanical brake system.

* * * * *